United States Patent
Yokoyama et al.

(10) Patent No.: US 7,220,446 B2
(45) Date of Patent: May 22, 2007

(54) MANAGEMENT TECHNIQUE OF FRICTION COEFFICIENT BASED ON SURFACE ROUGHNESS, SUBSTRATE FOR INFORMATION RECORDING MEDIUM, INFORMATION RECORDING MEDIUM AND MANUFACTURE METHOD THEREOF

(75) Inventors: Tomotaka Yokoyama, Tokyo (JP); Hiroshi Tomiyasu, Tokyo (JP); Masatomo Shibui, Tokyo (JP); Nobuyuki Eto, Tokyo (JP)

(73) Assignee: Hoya Corporation (JP)

( * ) Notice: Subject to any disclaimer, the term of this patent is extended or adjusted under 35 U.S.C. 154(b) by 0 days.

(21) Appl. No.: 10/761,771

(22) Filed: Jan. 20, 2004

(65) Prior Publication Data

US 2004/0170870 A1    Sep. 2, 2004

Related U.S. Application Data

(62) Division of application No. 09/741,978, filed on Dec. 20, 2000, now Pat. No. 6,706,427.

(30) Foreign Application Priority Data

Dec. 21, 1999 (JP) .................................. 11-363416

(51) Int. Cl.
    *B32B 5/66* (2006.01)
(52) U.S. Cl. ...................... 427/128; 427/129; 427/130; 428/694 ST; 428/694 SG
(58) Field of Classification Search .......... 428/694 ST, 428/694 SG; 427/128, 129, 130
    See application file for complete search history.

(56) References Cited

U.S. PATENT DOCUMENTS

| | | | | |
|---|---|---|---|---|
| 4,770,550 A | * | 9/1988 | Takahashi | 384/495 |
| 5,599,590 A | * | 2/1997 | Hayashi et al. | 427/448 |
| 6,187,441 B1 | * | 2/2001 | Takeuchi et al. | 428/410 |
| 6,277,465 B1 | * | 8/2001 | Watanabe et al. | 428/846.9 |
| 6,383,404 B1 | * | 5/2002 | Sakai et al. | 216/97 |
| 6,548,139 B2 | * | 4/2003 | Sakai et al. | 428/65.3 |
| 6,706,427 B2 | * | 3/2004 | Yokoyama et al. | 428/846.9 |
| 6,782,717 B2 | * | 8/2004 | Saito et al. | 65/30.14 |
| 6,790,509 B2 | * | 9/2004 | Yokoyama et al. | 428/848.2 |
| 6,877,343 B2 | * | 4/2005 | Watanabe et al. | 65/61 |

* cited by examiner

*Primary Examiner*—Leszek Kiliman
(74) *Attorney, Agent, or Firm*—Cook, Alex, McFarron, Manzo, Cummings & Mehler, Ltd.

(57) ABSTRACT

There are disclosed an information recording medium substrate having a surface roughness of Rmax 15 nm or less, and an information recording medium, particularly an information recording medium substrate and information recording medium in which for surfaces of the substrate and medium, a bearing area value (offset bearing area value) in a depth of 0.5 to 5 nm (predetermined slice level) from a bearing height (real peak height) corresponding to the bearing area value of 0.2% to 1.0% is 90% or less, and a manufacture method of the substrate and medium.

9 Claims, 9 Drawing Sheets

ROUGHNESS CHANGE BY $H_2SIF_6$ TREATMENT
AFTER CHEMICAL REINFORCEMENT (Ra)

ROUGHNESS CHANGE BY $H_2SIF_6$ TREATMENT
AFTER CHEMICAL REINFORCEMENT (Rmax)

ROUGHNESS CHANGE BY $H_2SIF_6$ TREATMENT
AFTER CHEMICAL REINFORCEMENT (OBA3nm)

MANAGEMENT TECHNIQUE OF FRICTION COEFFICIENT BASED ON SURFACE ROUGHNESS, SUBSTRATE FOR INFORMATION RECORDING MEDIUM, INFORMATION RECORDING MEDIUM AND MANUFACTURE METHOD THEREOF

This application is a divisional of U.S. application Ser. No. 09/74 1,978 filed Dec. 20, 2000 now U.S. Pat. No. 6,706,427.

REFERENCE TO RELATED APPLICATION

This application claims the priority right under Paris Convention of Japanese Patent Application No. Hei 11-363416 filed on Dec. 21, 1999, the entire disclosure of which is incorporated herein by reference.

BACKGROUND OF THE INVENTION

1. Field of the Invention

The present invention relates to a management technique of a friction coefficient based on surface roughness, an information recording medium substrate, an information recording medium and a manufacture method thereof.

2. Description of the Related Art

There is a magnetic recording medium loaded with HDD as an information recording medium. A remarkably rapid increase of a recording capacity of a hard disk drive (HDD) in recent years is realized, for one thing, by lowering (lowering glide) a gap between a magnetic head (a head) and a magnetic recording medium (a medium) during recording/reproduction (head flying height). The lowering of the gap between the head and the medium is realized by an attempt to smooth a medium surface, but the smoothed medium surface causes an adsorption problem between the head and the medium. Therefore, design of the medium surface is always troubled with trade-off between the lowering of glide and avoiding of head adsorption.

In order to solve mutually contradictory problems of the smoothing of the medium surface required for the lowered glide, and the avoiding of an adsorption tendency accompanied by the smoothing (=tendency of increase of a friction coefficient), a precision surface design is necessary.

For shape management of the medium surface, from a point of view that process feedback is easy, surface roughness parameters such as Rmax and Ra by an atomic force microscope (AFM), normalized roughness Ra/Rmax, and the like have heretofore been used.

Herein, Ra and Rmax are defined by the Japanese Industrial Standard (JIS B0601). Rmax is the above-mentioned maximum height (the distance from a highest peak to a lowest valley), Ra is the above-mentioned center-line-mean roughness (the average of an absolute value of a deviation from a center line of a roughness curve to the roughness curve.

However, by checking a relation between Rmax, Ra or Ra/Rmax measured by AFM and the friction coefficient, it has been found that in a low glide area (about 10 nm or less) requiring more precise surface design, such surface management technique is extremely bad in sensitivity. FIGS. 1 and 2 show the relation between the substrate surface roughness (Rmax (FIG. 1), Ra (FIG. 2)) measured by AFM and the friction coefficient. Even in the same Rmax (e.g. Rmax of about 7.5 nm) and the friction coefficient with a range of 0.7 to 2.2, and it is thus impossible to manage the friction coefficient with the parameters such as Rmax and Ra.

On the other hand, there is proposed a technique of taking a correlation between a bearing area (bearing ratio) and the friction coefficient to manage the friction coefficient. Specifically, in a magnetic recording medium constituted by forming texture on a medium surface, there is proposed a technique of forming the texture (concave/convex) in such a manner that the bearing area in a depth of 20 nm from a surface top portion is 20% or less, and defining the friction coefficient to be small (Japanese Patent Application Laid-Open No. 189756/1993). Additionally, the bearing area means a proportion occupied by an area appearing when the concave/convex in a measured area is cut on an arbitrary equal height surface (horizontal surface) in the measured area, and can be measured using the atomic force microscope (AFM) or the like.

However, the technique principally aims at the magnetic recording medium formed by polishing an aluminum alloy substrate surface with an NiP film formed thereon with a free abrasive grain and performing a texture processing, and uses the bearing area in the depth of 20 nm from the surface top portion as the parameter (i.e., a rough magnetic recording medium with a surface roughness of 20 nm or more is an object). Therefore, there is a problem that with respect to the magnetic recording medium having a surface roughness of Rmax 15 nm or less, the technique is completely useless as a friction-coefficient management technique.

Additionally, the technique is derived from an experiment, and is not derived based on theories such as a real contact area described later.

Furthermore, for example, when a texture forming method differs, the total number of protrusions, protrusion mode (protrusion curvature radius or horizontal sectional shape, protrusion height), and the like differ. Even with the same Rmax or Ra, the friction coefficient by the medium surface differs. Therefore, in this case, the aforementioned technique is completely useless as the management technique of the friction coefficient of the medium surface.

SUMMARY OF THE INVENTION

The present invention has been developed under the aforementioned background, and an object thereof is to provide an inventive surface management technique in which a precise surface design is obtained even in a low glide area of about 10 nm or less, substrate for an information recording medium (substrate for a magnetic recording medium) designed by the surface management technique, an information recording medium (a magnetic recording medium) and a manufacture method thereof.

As a result of intensive researches on a friction force acting on a magnetic head, the present inventors have found the following.

The friction force acting on the magnetic head can be represented by the following equation (1) because a lubricant and moisture in air usually exist on a contact surface.

$$F = \mu N + F1 + F2 + F3 + \ldots \quad (1)$$

In the above equation (1), F is a friction force, $\mu$ is a coefficient static friction, N is a normal force, F1 is a meniscus force by the lubricant, F2 is a meniscus force of the moisture, and F3 is a cohesive force by other materials (organic contaminant, and the like). In a contact surface of the surface of a head (or a pad of a padded slider for a purpose of reducing a contact area with a magnetic disk) with a medium surface having a certain surface roughness, since there is a concave/convex on the medium surface, as compared with an apparent contact area, a real contact area is extremely small. When a head load is added, by a pressure concentrated on a convex portion vertex, the convex portion vertex is crushed, the real contact area increases, and the friction force increases. However, there is no change in the apparent contact area. Since stiction (cohesion) of contacted surfaces occurs in the real contact surface, with increase of the real contact area, a large force (a force for cutting off the friction force) is necessary for separating (shearing) the cohesion surfaces. Therefore, it can be said that $\mu N \propto$ the real contact area.

Therefore, from a standpoint of surface design, it is assumed that when a shape parameter representative of the real contact area between the magnetic head and the medium is extracted, an indication sensitive to friction is theoretically obtained.

When the surface roughness obtained by precisely polishing a glass substrate surface is Rmax 15 nm or less, the real contact area between the magnetic head and the medium is proportional to the total number of protrusions able to contact the head (FIG. 9). By checking a relation between the total number of protrusions present in a predetermined depth of 4 nm from a maximum protrusion height in a 5 μm square (5 μm*5 μm) AFM image and the friction coefficient, it has been found that the friction coefficient depends on (is proportional to) the total number of protrusions (protrusion density) in the predetermined depth. Additionally, since a certain degree of time is necessary for calculation of the protrusion density from AFM data, it cannot be said that process feedback is easy, and this is not a suitable parameter for process monitor. Therefore, it has been studied whether or not the protrusion density in the predetermined depth can directly be represented by some AFM measured value. Specifically, for example, by checking a relation between a bearing area in a depth position of 4 nm from the maximum protrusion height (Rmax) in the 5 μm square AFM image and the total number of protrusions in the same depth position, it has been found that the bearing area of the predetermined depth position is in a proportional relation to the protrusion density in the predetermined depth. Furthermore, by checking a relation between the bearing area of the depth position of 4 nm from the maximum protrusion height (Rmax) in the 5 μm square AFM image and the friction coefficient, a relation of FIG. 10 has been obtained, and it has been found that the bearing area of the predetermined depth position is in a correlation with the friction coefficient. The bearing area of the predetermined depth position is easily obtained as an AFM measurement result, the process feedback is easy, and the area is a parameter suitable for the process monitor.

As described above, it has been found that, for example, by using the bearing area in the vicinity of the depth of 4 nm from the maximum protrusion height (Rmax) as the shape parameter representative of the real contact area, with respect to a magnetic recording medium having surface roughness of Rmax 15 nm or less, the friction coefficient can be managed.

However, when the bearing area is measured by AFM, there is a capability (measurement error) measurement in AFM itself. Moreover, by the presence of an abnormal protrusion (irregular point), such as dust, which fails to influence a glide height or the friction coefficient, the AFM measurement error is sometimes generated. Because of the error, Rmax by AFM measurement does not represent a real peak height. The error is usually of the order of 1 to 2 nm, and largely influences the magnetic recording medium having the surface roughness (texture) of Rmax 15 nm or less. Particularly, with respect to the magnetic recording medium having the surface roughness (texture) of Rmax 10 nm or less, the influence of the error of 1 to 2 nm is remarkably large. For example, when the maximum protrusion height deviates by 1 to 2 nm, a slice level also deviates by 1 to 2 nm, and it is sometimes impossible to manage the friction coefficient in the bearing area corresponding to the slice level. Even in a case in which the management is possible, for the magnetic recording medium friction coefficient managed by the bearing area, since the slice level is disordered (is not optimum), the error is large, and it has been found that the friction coefficient management technique is insufficient.

Moreover, as a result of further researches, it has been found that when a bearing curve is repeatedly measured by AFM, by obtaining a bearing area value with a bearing height measured value rapidly starting to scatter in the vicinity of the maximum protrusion height (BA=0%), and utilizing various AFM measured values excluding data from BA=0% to the bearing area value with the bearing height measured value rapidly starting to scatter, the AFM measurement scattering problem can be solved.

For example, when the repeated measurement of the bearing curve is performed with respect to the surface having a surface roughness Rmax of about 15 nm or less by the atomic force microscope (AFM), in the vicinity of the maximum protrusion height (BA=0%), the bearing area value is obtained at which the measured value of the bearing height rapidly starts to scatter (0.5% in FIG. 7), and the corresponding bearing height (real peak height) is obtained from the bearing curve (FIG. 8). A correlation of the bearing area in the predetermined depth (3 nm in FIG. 8) from the real peak, that is, the bearing area (offset bearing area: OBA %) when the slice level is offset (subtracted) with the friction coefficient of the medium surface is checked by changing the predetermined depth, and from this correlation, with respect to a friction coefficient change amount, a predetermined depth (predetermined slice level) is obtained at which the corresponding bearing area change amount increases. It has been found that the friction coefficient based on the surface roughness can be managed with good precision by performing management of the friction coefficient based on the correlation (e.g., FIG. 5) of the bearing area value (offset bearing area value) in the predetermined slice level with the friction coefficient.

In this manner, by employing OBA % as the indication sensitive to friction, and employing the OBA % as a process monitor indication, the friction coefficient based on the surface roughness can be managed with good precision.

Moreover, in the medium surface design, by beforehand obtaining a correlation of forming conditions for forming a certain medium surface state (total number of protrusions, curvature, and the like) with OBA %, via the correlation between OBA % and friction coefficient, the friction coefficient based on the surface roughness can be designed with good precision, and a magnetic recording medium having a desired friction coefficient can be obtained by selecting the forming conditions.

The present invention is provided with the following constitutions.

(Constitution 1) An information recording medium substrate having a surface roughness of Rmax 15 nm or less, wherein for a substrate surface, a bearing area value (offset bearing area value) in a depth of 0.5 to 5 nm (predetermined slice level) from a bearing height (real peak height) corresponding to the bearing area value of 0.2% to 1.0% is 90% or less.

(Constitution 2) An information recording medium substrate having a surface roughness of Rmax 15 nm or less, wherein for a substrate surface, when a depth corresponds to 20 to 45% of Rmax from a bearing height (real peak height) corresponding to a bearing area value of 0.2% to 1.0% is set as a slice level, the bearing area value (offset bearing area value) is 90% or less.

(Constitution 3) The information recording medium substrate according to constitution 1 or 2 wherein the information recording medium substrate is a glass substrate whose surface is subjected to precision polishing and/or etching treatment.

(Constitution 4) An information recording medium having a surface roughness of Rmax 15 nm or less on a medium surface, wherein for a medium surface of the information recording medium, a bearing area value (offset bearing area value) in a depth of 0.5 to 5 nm (predetermined slice level) from a bearing height (real peak height) corresponding to the bearing area value of 0.2% to 1.0% is 90% or less.

(Constitution 5) An information recording medium having a surface roughness of Rmax 15 nm or less on a medium surface, wherein for a medium surface of the magnetic recording medium, when a depth corresponds to 20 to 45% of Rmax from a bearing height (real peak height) corresponding to a bearing area value of 0.2% to 1.0% is set as a slice level, the bearing area value (offset bearing area value) is 90% or less.

(Constitution 6) The information recording medium according to constitution 4 or 5 wherein a friction coefficient based on the surface roughness of the medium surface is 3 or less.

(Constitution 7) The information recording medium according to constitutions 4 to 6 wherein a correlation of the friction coefficient in the information recording medium with various lubricants formed thereon with an offset bearing area is checked, and the lubricant with a reduced friction force by the lubricant is employed.

(Constitution 8) The information recording medium according to constitution 7 wherein the lubricant is a lubricant classified in perfluoro alkyl polyether (PFPE), including ether joining in a main chain, having —$(OCF_2F_2)_m(OCF_2)_n$— straight chain structure, and having a hydroxyl group as a terminal group.

(Constitution 9) A manufacture method of a glass substrate for an information recording medium, comprising steps of: immersing the glass substrate in a heated chemical reinforcing treatment liquid, and subjecting an ion on a glass substrate surface layer to ion exchange with an ion in the chemical reinforcing treatment liquid to chemically reinforce the glass substrate; and treating the surface of the glass substrate drawn up from the chemical reinforcing treatment liquid with a treatment liquid containing silicofluoric acid.

(Constitution 10) A manufacture method of a glass substrate for an information recording medium, provided with steps of: polishing a glass substrate surface; and immersing the glass substrate in a heated chemical reinforcing treatment liquid, and subjecting an ion of a glass substrate surface layer to ion exchange with an ion in the chemical reinforcing treatment liquid to chemically reinforce the glass substrate, the method comprising steps of: controlling the glass substrate surface by a chemical treatment to provide a desired surface roughness before the chemical reinforcing step; and treating the surface of the glass substrate drawn up from the chemical reinforcing treatment liquid with a treatment liquid containing silicofluoric acid.

(Constitution 11) The manufacture method of the glass substrate for the information recording medium according to constitution 10 wherein the chemical treatment comprises treatment with the treatment liquid containing at least one acid selected from the group consisting of sulfuric acid, phosphoric acid, nitric acid, hydrofluoric acid, and silicofluoric acid, or alkali.

(Constitution 12)—The manufacture method of the glass substrate for the information recording medium according to any one of constitutions 9 to 11 wherein a concentration of the silicofluoric acid is in a range of 0.01 to 10 wt %.

(Constitution 13) A manufacture method of an information recording medium, comprising steps of forming at least a recording layer on the surface of the information recording medium glass substrate obtained by constitutions 9 to 12.

(Constitution 14) A management technique of a friction coefficient based on a surface roughness in an information recording medium surface having a surface roughness of Rmax 15 nm or less, comprising steps of: when repeated measurement of a bearing curve is performed by an atomic force microscope (AFM), obtaining a bearing area value at which a measured value of a bearing height rapidly starts to scatter in the vicinity of a maximum protrusion height (BA=0%), and obtaining the bearing height (real peak height) corresponding to the bearing area value from the bearing curve; checking a correlation of a bearing area in a predetermined depth from the real peak height with the friction coefficient based on the surface roughness by changing the predetermined depth; from the correlation, with respect to a change amount of the friction coefficient, obtaining a predetermined depth (predetermined slice level) at which the corresponding change amount of the bearing area increases; and using the bearing area value (offset bearing area value) in the predetermined slice level to manage the friction coefficient based on the surface roughness.

(Constitution 15) A management technique of a friction coefficient based on a surface roughness in an information recording medium having a surface roughness of Rmax 15 nm or less on a medium surface, comprising steps of: using a bearing area in a depth of 0.5 to 7 nm (slice level) from a maximum height (Rmax) by AFM measurement to manage the friction coefficient based on the surface roughness.

(Constitution 16) A management technique of a friction coefficient based on a surface roughness in an information recording medium having a surface roughness of Rmax 15 nm or less on a medium surface, comprising steps of: using a bearing area when a depth corresponds to 20 to 40% of Rmax from a maximum height (Rmax) by AFM measurement is set as a slice level, and managing the friction coefficient based on the surface roughness.

(Constitution 17) An information recording medium manufacture method for manufacturing an information recording medium having a desired medium surface based on the management technique of the friction coefficient based on the surface roughness according to constitutions 14 to 16.

(Constitution 18) A manufacture method of an information recording medium substrate for reflecting an information recording medium substrate surface in an information recording medium surface to obtain a desired medium surface, the method comprising steps of manufacturing the information recording medium substrate having a desired substrate surface based on the management technique of the friction coefficient based on the surface roughness according to constitutions 14 to 16.

(Constitution 19) A management technique of a surface state of an information recording medium substrate surface having a surface roughness of Rmax 15 nm or less, the technique comprising steps of: when repeated measurement of a bearing curve is performed by an atomic force microscope (AFM), obtaining a bearing area value at which a measured value of a bearing height rapidly starts to scatter in the vicinity of a maximum protrusion height (BA=0%); and utilizing various AFM measured values excluding data from BA=0% to the bearing area value at which the bearing height measured value rapidly starts to scatter.

(Constitution 20) An information recording medium substrate manufacture method for manufacturing an information recording medium substrate having a desired substrate surface based on the surface state management technique of constitution 19.

(Constitution 21) A management technique of a surface state of an information recording medium surface having a surface roughness of Rmax 15 nm or less, the technique comprising steps of: when repeated measurement of a bearing curve is performed by an atomic force microscope (AFM), obtaining a bearing area value at which a measured value of a bearing height rapidly starts to scatter in the vicinity of a maximum protrusion height (BA=0%); and utilizing various AFM measured values excluding data from BA=0% to the bearing area value at which the bearing height measured value rapidly starts to scatter.

(Constitution 22) An information recording medium manufacture method for manufacturing an information recording medium having a desired medium surface based on the surface state management technique of constitution 21.

According to the constitution 1, with respect to the surface of the information (magnetic) recording medium substrate, in the method described in constitution 14 described later, by obtaining, from an experiment, the bearing area value of 0.2% to 1.0% at which the bearing height measured value rapidly starts to scatter, further obtaining the depth of 0.5 to 5 nm from the real peak height as the slice level, and defining the bearing area value (offset bearing area value: OBA %) in the slice level to 90% or less to form the information (magnetic) recording medium, the information (magnetic) recording medium whose friction coefficient based on the surface roughness is small (usually, 3 or less) is obtained.

Moreover, like the constitution 2, by setting the depth of the slice level in the constitution 1 to the depth of slice level corresponds to 20 to 45% of Rmax, and defining the bearing area value (offset bearing area value: OBA %) in the slice level to 90% or less to form the information (magnetic) recording medium, the information (magnetic) recording medium whose friction coefficient based on the surface roughness is small (usually 3 or less) is obtained.

Particularly, the constitutions 1, 2 are suitable for the substrate in which the surface roughness of the information (magnetic) recording medium substrate is Rmax 10 nm or less.

Additionally, in the information (magnetic) recording medium substrate with surface roughness Rmax of around 10 to 11 nm, for example, it is preferable that the slice level is 4 nm (36 to 40% of Rmax), OBA % is 70% or less. In the magnetic recording medium substrate with Rmax of around 7 to 8 nm, for example, it is preferable that the slice level is 3 nm (38 to 43% of Rmax) and OBA % is 90% or less (preferably 40%±20% (20 to 60%) with a CSS system information (magnetic) recording medium substrate and preferably 70%±20% (50 to 90%) with a load/unload system information (magnetic) recording medium substrate). In the information (magnetic) recording medium substrate with Rmax of around 5 to 6 nm, for example, it is preferable that the slice level is 1.5 to 2 nm (25 to 40% of Rmax) and OBA % is 80% or less (preferably 60%±20% (40 to 80%) with the load/unload system information (magnetic) recording medium substrate). Moreover, in the information (magnetic) recording medium substrate with Rmax of 3 nm or less, in which the substrate surface is super-smooth, for example, it is preferable that the slice level is 0.5 to 1.3 nm (20 to 43% of Rmax) and OBA % is 90% or less (preferably 70%±20% (50 to 90%) with the load/unload system information (magnetic) recording medium substrate).

Additionally, the bearing area value at which the measured value of the bearing height rapidly starts to scatter may be of the order of 0.5%, specifically in a range of 0.2 to 1.0%, preferably 0.3 to 0.7%, more preferably 0.4 to 0.6%.

According to the constitution 3, when the information (magnetic) recording medium substrate is a glass substrate with the surface subjected to precision polishing and/or etching treatment, and therefore the magnetic recording medium substrate according to the constitution 1 or 2 is securely and easily obtained. As the concrete manufacture method of etching treatment, means of the constitutions 9 to 12 described later are exemplified.

According to the constitutions 4, 5, similarly as the constitutions 1, 2, obtained is the information (magnetic) recording medium which has the surface roughness of Rmax 15 nm or less on the medium surface and in which the friction coefficient based on the surface roughness of the medium surface is small (usually 3 or less).

Particularly, the constitution 4, 5 are suitable for the information (magnetic) recording medium in which the surface roughness of the information (magnetic) recording medium surface is Rmax 10 nm or less.

Additionally, in the information (magnetic) recording medium in which the surface roughness of the medium surface is Rmax of around 10 to 11 nm, for example, it is preferable that the slice level is 4 nm (36 to 40% of Rmax) and OBA % is 70% or less. In the information (magnetic) recording medium with Rmax of around 7 to 8 nm, for example, it is preferable that the slice level is 3 nm (38 to 43% of Rmax) and OBA % is 90% or less (preferably 40%±20% (20 to 60%) with the CSS system information (magnetic) recording medium, and preferably 70%±20% (50 to 90%) with the load/unload system information (magnetic) recording medium). In the information (magnetic) recording medium with Rmax of around 5 to 6 nm, for example, it is preferable that the slice level is 1.5 to 2 nm (25 to 40% of Rmax) and OBA % is 80% or less (preferably 60%±20% (40 to 80%) with the load/unload system information (magnetic) recording medium). Moreover, in the information (magnetic) recording medium with Rmax of 3 nm or less, in which the medium surface is super-smooth, for example, it is preferable that the slice level is 0.5 to 1.3 nm (20 to 43% of Rmax) and OBA % is 90% or less (preferably 70%±20% (50 to 90%) with the load/unload system information (magnetic) recording medium).

Additionally, the bearing area value at which the bearing height measured value rapidly starts to scatter may be of the order of 0.5%, specifically in a range of 0.2 to 1.0%, preferably 0.3 to 0.7%, more preferably 0.4 to 0.6%.

In order to obtain the medium surface of the constitutions 4 to 6, there are: a method of controlling the surface state of the medium surface in accordance with the substrate surface like the constitutions 1 to 3, and forming an underlayer, recording (magnetic) layer, protective layer, and lubricant layer on the substrate surface to obtain the desired medium surface; a method of controlling the surface state of any layer formed on the substrate to obtain the desired medium surface; and the like. As the method of controlling the surface state, a mechanical treatment, chemical treatment, growth of a crystal grain by sputtering, optical treatment by laser light, and the like are exemplified.

Additionally, by using the information (magnetic) recording medium glass substrate obtained by subjecting the surface of the constitution 3 to the precision polishing and/or the etching treatment, the information (magnetic) recording medium according to the constitutions 4 to 6 is securely, easily and preferably obtained. Moreover, since it is unnecessary to dispose a layer for controlling the surface state of the medium surface between the recording (magnetic) layer and the magnetic head, spacing (flying height) between the information (magnetic) recording medium and the magnetic head is reduced, and high recording density reproduction is preferably enabled.

According to the constitution 6, by defining the friction coefficient based on the surface roughness of the medium surface to 3 or less, the information (magnetic) recording medium is securely obtained in which the friction coefficient based on the surface roughness is 3 or less. The friction coefficient is preferably 2 or less, more preferably 1.5 or less.

According to the constitution 7, by checking the correlation of the friction coefficient in the information (magnetic) recording medium with various lubricants formed thereon with the offset bearing area, the lubricant with the reduced friction force by the lubricant can be selected.

Additionally, needless to say, by using the management technique of the friction coefficient based on the surface roughness according to the constitutions 14 to 16, forming the lubricant on the surface, and similarly performing evaluation, the lubricant with the reduced friction force by the lubricant can be selected.

According to the constitution 8, by using the lubricant classified in perfluoro alkyl polyether (PFPE), including ether joining in the main chain, having —$(OCF_2F_2)_m(OCF_2)_n$— straight chain structure, and having the hydroxyl group as the terminal group, the friction force by the lubricant can securely be reduced.

The constitutions 9 to 14 are concrete methods for obtaining the information (magnetic) recording medium substrates of the constitutions 1 to 3, and the information (magnetic) recording mediums of the constitutions 4 to 8. Additionally, the information (magnetic) recording medium substrates of the constitutions 1 to 3, and the information (magnetic) recording mediums of the constitutions 4 to 8 are not limited by the following manufacture methods.

According to the constitution 9, by performing the steps of: immersing the glass substrate in the heated chemical reinforcing treatment liquid, and subjecting the ion of the glass substrate surface layer to ion exchange with the ion in the chemical reinforcing treatment liquid to chemically reinforce the glass substrate; and treating the surface of the glass substrate drawn up from the chemical reinforcing treatment liquid with the treatment liquid containing silicofluoric acid, a surface roughness scattering is suppressed, and it is possible to accurately control OBA %. By elucidating causes of the measurement scattering of AFM itself during measurement of the bearing area by AFM (the measurement error from abnormal protrusion which supposedly fails to influence the glide height or the friction coefficient) with respect to the chemical reinforcing glass substrate, it has been found that many abnormal protrusions as the causes of the measurement scattering are generated in the chemical reinforcing treatment step, or that the surface roughness increases by the chemical reinforcing treatment step after the precision polishing. Moreover, it has been considered that by suppressing the causes of the measurement scattering, the OBA % can accurately be controlled. For a treatment after the chemical reinforcing treatment, there is a method of cleaning the glass substrate surface with the chemical treatment liquid, and as the chemical treatment liquid, the treatment liquid containing silicofluoric acid is preferable rather than the treatment liquid containing sulfuric acid. This is because with sulfuric acid treatment, scattering is produced in a value of OBA %. By performing the silicofluoric acid treatment as the treatment after the chemical reinforcing treatment, the abnormal protrusion as the cause of the measurement scattering is removed, and it is possible to strictly control OBA %.

Moreover, like the constitution 10, it is preferable to control the glass substrate surface by the chemical treatment and provide the desired surface roughness before the chemical reinforcing step. If the chemical treatment (excluding silicofluoric acid) for the control to obtain the desired surface roughness is performed after the chemical reinforcing treatment, a change is brought about in the chemical reinforcing layer (compression stress layer, pulling stress layer), and deterioration of flatness of the substrate is unfavorably caused.

Like the constitution 11, the chemical treatment is performed with the treatment liquid containing at least one acid selected from sulfuric acid, phosphoric acid, nitric acid, hydrofluoric acid, and silicofluoric acid, or alkali. Concentration, treatment temperature, and treatment time of these acids and alkali are appropriately adjusted in accordance with the substrate surface state to be obtained.

Like the constitution 12, the concentration of silicofluoric acid for the silicofluoric acid treatment after the chemical reinforcing treatment is preferably in a range of 0.01 to 10 wt %. When the concentration is less than 0.01 wt %, the abnormal protrusion as the cause of the AFM measurement scattering unfavorably fails to be securely removed in some case. With the concentration exceeding 10 wt %, the glass substrate surface is etched, the surface state of the substrate surface formed by chemical treatment before the chemical reinforcing treatment changes, and the surface roughness unfavorably increases. The concentration is preferably 0.05 to 7 wt %, more preferably 0.1 to 5 wt % in respect of controlling property.

Moreover, like the constitution 13, by forming at least a recording (magnetic) layer on the surface of the recording (magnetic) recording medium glass substrate obtained by the constitutions 9 to 12, the information (magnetic) recording medium provided with the desired friction coefficient can be obtained. A magnetic layer material in the present invention is not particularly limited. A known magnetic layer material can be used. Moreover, besides the magnetic layer, it is also possible to form an underlayer for controlling a crystal orientation of the magnetic layer to enhance a magnetic characteristic, a protective layer for enhancing anticorrosion and mechanical durability of the magnetic recording medium, a lubricant layer for adjusting the friction coefficient, a seed layer for controlling crystal grain diameter and grain diameter distribution of the underlayer and magnetic layer, and the like. Also for the seed layer, underlayer, protective layer, and lubricant layer, known materials can be used.

According to the constitution 14, since the correlation of the offset bearing area with the friction coefficient (e.g., FIG. 5) is in a proportional relation and a correlation high in sensitivity, the friction coefficient based on the surface roughness in the information (magnetic) recording medium surface can be designed or managed with good precision using the offset bearing area.

Particularly, when the friction coefficient based on the medium surface roughness of the information (magnetic) recording medium is managed, the constitution 14 can be applied to the surface roughness management of the information (magnetic) recording medium substrate and information (magnetic) recording medium, and is suitable for the surfaces having the surface roughness of Rmax 15 nm or less, and further Rmax 10 nm or less.

By using the bearing area in the depth of 0.5 to 7 nm (slice level) from the maximum protrusion height (Rmax) according to the constitution 15, or using the bearing area when the depth corresponds to 20 to 40% of Rmax from the maximum protrusion height (Rmax) is set as the slice level according to the constitution 16, and managing the friction coefficient based on the surface roughness, even with the influence of the AFM measurement scattering, it is possible to substantially design or manage the friction coefficient based on the surface roughness.

According to the constitution 17, by manufacturing the information (magnetic) recording medium having the desired medium surface based on the management technique of the friction coefficient based on the surface roughness of the constitutions 14 to 16, the information (magnetic) recording medium having the desired friction coefficient can be obtained. As the method of obtaining the information (magnetic) recording medium having the desired medium surface, there are: a method of controlling the surface state of the medium surface in accordance with the substrate surface, and forming the underlayer, recording (magnetic) layer, protective layer, and lubricant layer on the substrate surface to obtain the desired medium surface; a method of controlling the surface state of any layer formed on the substrate to obtain the desired medium surface; and the like.

Particularly, in order to reduce the spacing (flying height) between the information (magnetic) recording medium and the magnetic head to enable the high recording density reproduction, it is preferable to control the substrate surface. Like the constitution 18, the present invention is preferably applied to the manufacture method of the information (magnetic) recording medium substrate having the desired substrate surface based on the management technique of the friction coefficient based on the surface roughness of the constitutions 14 to 16.

According to the constitutions 19 or 21, as the management technique of the surface states of the information (magnetic) recording medium substrate and information (magnetic) recording medium, by utilizing various AFM measured values excluding data from BA=0% to the bearing area value at which the bearing height measured value rapidly starts to scatter, the AFM measurement scattering problem can be solved. For example, when OBA % is used, the influence of the AFM measurement error is hardly exerted, and the friction coefficient based on the surface roughness can be designed or managed with good precision.

Additionally, various AFM measured values referred to in the constitution 19 or 21 include not only the offset bearing area (OBA %), but also Rmax, Ra, Ra/Rmax, bearing area (BA %), and the like.

Moreover, for example, by excluding the data with scattering measured values from the AFM measured data, and using the data after the exclusion to obtain the bearing curve, Rmax, Ra, Ra/Rmax, BA %, and the like, the influence of AFM measurement error can be removed, and accurate data can be obtained. These operations can easily be performed by settings in an AFM measurement apparatus.

Like the constitution 20, by applying the present invention to the manufacture method of the information (magnetic) recording medium substrate having the desired substrate surface based on the management technique of the surface state of the constitution 19, the information (magnetic) recording medium substrate for obtaining the information (magnetic) recording medium having the desired friction coefficient can be obtained.

Moreover, like the constitution 22, by applying the present invention to the manufacture method of the information (magnetic) recording medium having the desired medium surface based on the surface state management technique of the constitution 21, the information (magnetic) recording medium having the desired friction coefficient can be obtained.

DETAILED DESCRIPTION OF THE PREFERRED EMBODIMENTS

Figure 11:
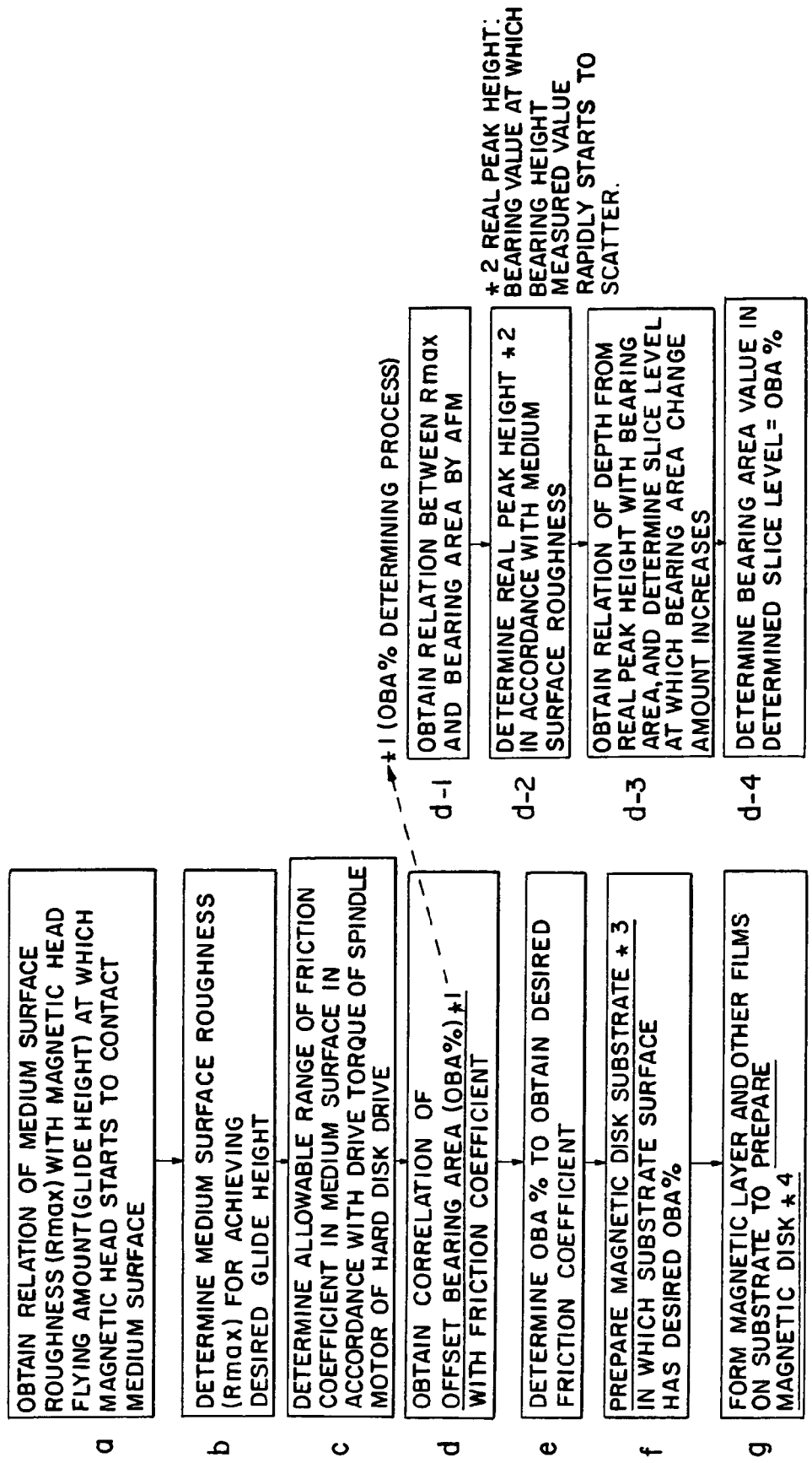
FIG. 11 is an explanatory view of a medium design of a magnetic recording medium, and a manufacture method of a magnetic recording medium substrate and magnetic recording medium.
Figure 12:
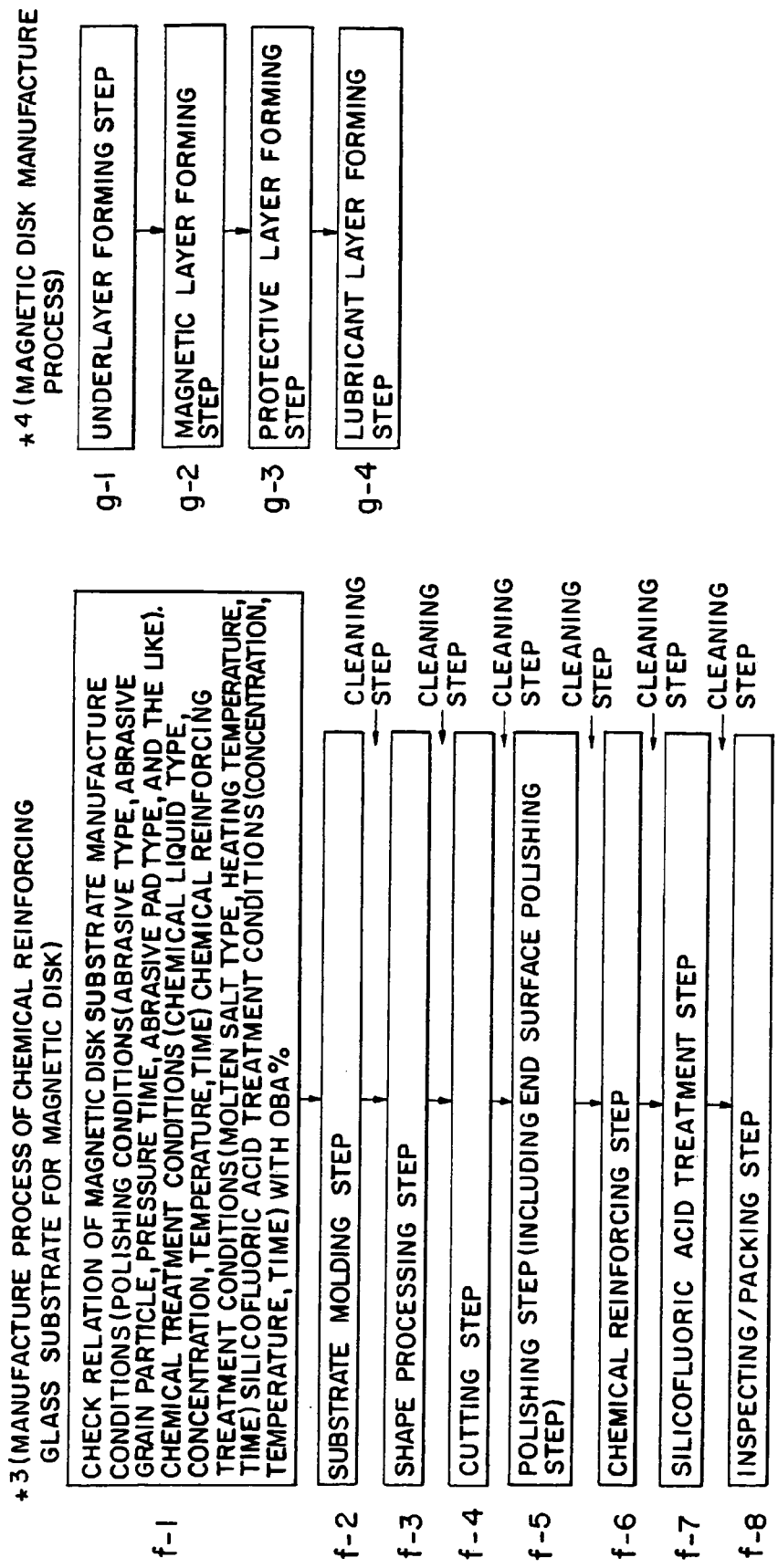
FIG. 12 is an explanatory view of a manufacture method of a magnetic recording medium substrate and magnetic recording medium.

A medium design of a magnetic recording medium mounted on a hard disk drive of the present invention, and a manufacture method of a magnetic recording medium substrate and magnetic recording medium will be described hereinafter. FIG. 11 is an explanatory view of the medium design of the magnetic recording medium, and the manufacture method of the magnetic recording medium substrate and magnetic recording medium. FIG. 12 is an explanatory view of the manufacture method of the magnetic recording medium substrate and magnetic recording medium.

In order to finally obtain the magnetic recording medium, as listed in FIG. 11, manufacture is performed through a roughly divided medium design process (process a to e), magnetic recording medium substrate manufacture process (process f), and magnetic recording medium manufacture process (process g).

The medium (magnetic recording medium surface) design process includes:

a. a step of obtaining a relation of a surface roughness (Rmax) of a medium (magnetic recording medium) surface with a magnetic head flying amount (glide height) at which the magnetic head starts to contact the medium surface;

b. a step of determining the surface roughness (Rmax) of the medium surface for achieving a desired glide height from the relation obtained in the step a;

c. a step of determining an allowable range of a friction coefficient in the medium surface in accordance with a drive torque of a spindle motor of the hard disk drive;

d. a step of obtaining a correlation between an offset bearing area (OBA %) and the friction coefficient; and e. a step of determining OBA % for a desired friction coefficient from the correlation obtained in the step d. Additionally, the offset bearing area (OBA %) is a parameter for performing the medium surface design, and a characteristic of the present invention, and is determined by the following process (process d-1 to d-4 as listed in FIG. 11). The following process is usually determined by preparing a plurality of samples (magnetic recording mediums or magnetic recording medium substrates). The process includes:

d-1. a step of obtaining a relation between Rmax and a bearing area by AFM;

d-2. a step of determining a real peak height (bearing value at which a bearing height measured value rapidly starts to scatter) in accordance with a medium surface roughness;

d-3. a step of obtaining a correlation of the real peak height obtained by the step d-2 with the bearing area, and determining a slice level at which a bearing area change amount increases; and d-4. a step of determining a bearing area value (offset bearing area: OBA %) in the slice level determined in the step d-3.

Additionally, for the friction coefficient, and the surface roughness of the medium surface in the medium design process, a hard disk drive maker sets a certain degree of an allowable range from the relation with a recording density in many cases, and a magnetic recording medium substrate maker and magnetic recording medium maker omit the step c in some cases.

The magnetic recording medium substrate whose surface has a desired OBA % is prepared so that the medium surface indicates the OBA % determined by the medium design process. The manufacture process of a chemical reinforcing glass substrate for the magnetic recording medium of the present invention will be described hereinafter.

The manufacture process of the chemical reinforcing glass substrate for the magnetic recording medium, process f-1 to f-8 as listed in FIG. 12, includes:

f-1. a step (omission after determining manufacture condition) of checking a relation of manufacture conditions of the chemical reinforcing glass substrate for the magnetic recording medium with OBA %;

f-2. a substrate molding step of molding a disc-shaped glass substrate;

f-3. a shape processing step of making a center hole in the glass substrate, and cutting/processing inner/outer peripheries the disc-shaped substrate;

f-4. a cutting step of lapping a main surface of the glass substrate;

f-5. a polishing step of polishing the main surface of the glass substrate (Additionally, the process may include an end surface polishing step of polishing an end surface of the glass substrate as occasion demands.);

f-6. a chemical reinforcing step of reinforcing the glass substrate surface;

f-7. a step of treating the glass substrate subjected to the chemical reinforcing step with silicofluoric acid; and f-8. a step of inspecting and packing the glass substrate.

Additionally, a cleaning step of cleaning the glass substrate is appropriately introduced between the respective steps if necessary.

Moreover, examples of the manufacture conditions in the above step f-1 include: polishing conditions (abrasive type, abrasive grain diameter, pressure, time, polishing pad type, and the like) for polishing the substrate surface; chemical treatment conditions (chemical liquid type, concentration, temperature, time) for controlling a substrate surface roughness; chemical reinforcing treatment conditions (molten salt type, heating temperature, time) for subjecting the glass substrate to the chemical reinforcing treatment; silicofluoric acid treatment conditions (concentration, temperature, time) after chemical reinforcement; and the like. For the relations, various conditions are obtained by experiment, and therefore the step f-1 is sometimes omitted from the actual manufacture process of the glass substrate. Moreover, in the steps f-2 and f-3, a donut-shaped substrate can also be molded by direct press, and the steps f-2 and f-3 can also be performed in the same step.

Figure 13:
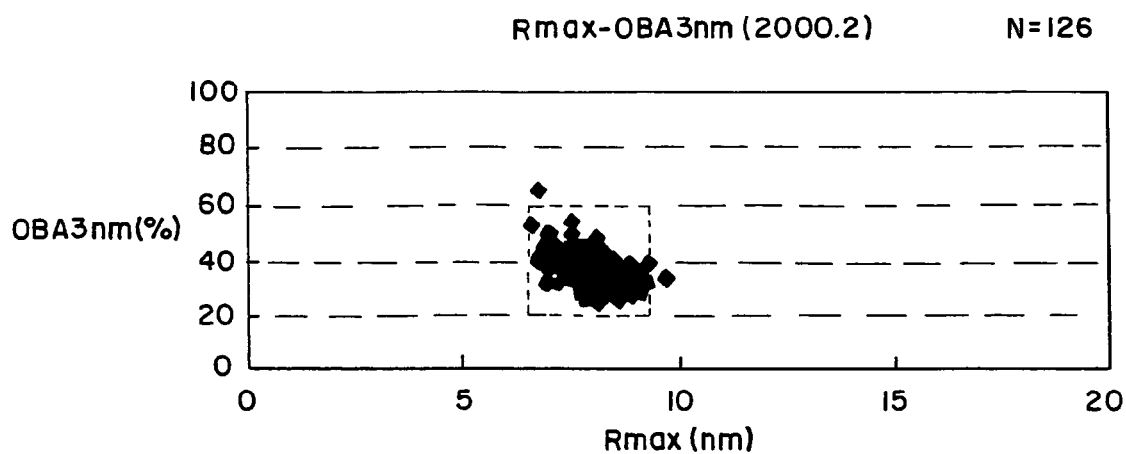
FIG. 13 is a diagram showing a relation between Rmax and OBA % 3 nm of a glass substrate for the magnetic recording medium obtained by subjecting a glass substrate surface to a silicofluoric acid treatment after a chemical reinforcing treatment.
Figure 14:
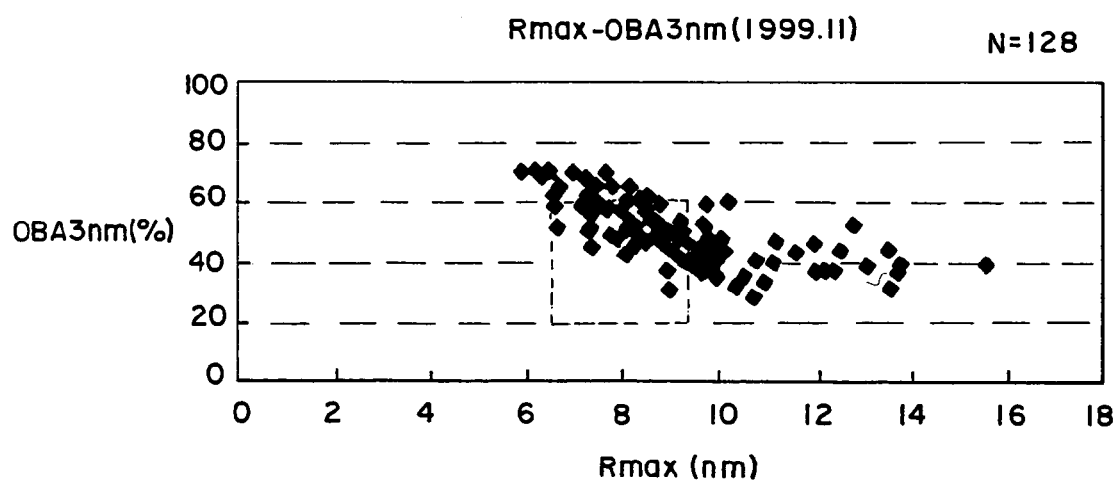
FIG. 14 is a diagram showing a relation between Rmax and OBA % 3 nm of the magnetic recording medium glass substrate obtained by subjecting the glass substrate surface to a sulfuric acid treatment after the chemical reinforcing treatment.

The manufacture process of the chemical reinforcing glass substrate of the present invention is characterized by a step of treating the surface of the glass substrate drawn up from a chemical reinforcing treatment liquid with a treatment liquid containing silicofluoric acid. By treating the glass substrate surface after the chemical reinforcing treatment with the treatment liquid containing silicofluoric acid, a surface roughness scattering is suppressed, and it is possible to accurately control OBA %. The silicofluoric acid treatment can effectively remove causes of measurement scattering of AFM itself (abnormal protrusion which supposedly fails to influence the glide height or the friction coefficient) and can strictly control OBA %. FIG. 13 is a diagram showing a relation between Rmax and OBA % 3 nm of the magnetic recording medium glass substrate obtained by the manufacture method of the magnetic recording medium glass substrate of the present invention (silicofluoric acid treatment conditions, concentration: 1.0 wt %, treatment time: 100 seconds, the number of substrates: 128), and FIG. 14 is a diagram showing a relation between Rmax and OBA % 3 nm of the magnetic recording medium glass substrate obtained by subjecting the glass substrate surface to the sulfuric acid treatment (sulfuric acid treatment conditions, concentration: 10 wt %, treatment time: 100 seconds, the number of substrates: 128) after the chemical reinforcing treatment. Additionally, both in FIGS. 13 and 14, the magnetic recording medium glass substrate is manufactured in such a manner that OBA % 3 nm is in a range of 20 to 40%. As seen from comparison of FIG. 13 with FIG. 14, in FIG. 13, the range is substantially OBA % 3 nm is 20 to 40%, and distribution is concentrated in the vicinity of Rmax of 8 nm. On the other hand, in FIG. 14, OBA % 3 nm fails to be in the range of 20 to 40%, and Rmax is broadly distributed from about 5 nm to about 16 nm. By subjecting the glass substrate surface to the silicofluoric acid treatment after the chemical reinforcing treatment in this manner, the causes of the measurement scattering (error) of AFM itself can effectively be removed, and it is seen that OBA % can strictly be controlled.

Subsequently, in order to obtain the magnetic recording medium, by forming a magnetic layer, and other films on the magnetic recording medium glass substrate obtained by the aforementioned process, the magnetic recording medium is manufactured. The typical manufacture process of the magnetic recording medium will be described hereinafter.

The manufacture process of the magnetic recording medium, process g-3 to g-4 as listed in FIG. 12, includes:

g-1. a step of forming an underlayer on the glass substrate;

g-2. a step of forming a magnetic layer on the underlayer;

g-3. a step of forming a protective layer on the magnetic layer; and g-4. a step of forming a lubricant layer on the protective layer.

Additionally, materials of the underlayer, magnetic layer, protective layer and lubricant layer are not particularly limited. Moreover, another underlayer between the glass substrate and the underlayer, and a seed layer for a purpose of controlling a crystal grain diameter and grain diameter distribution of the magnetic layer may be disposed. Moreover, an intermediate layer for controlling a crystal orientation of the magnetic layer may be disposed between the underlayer and the magnetic layer. The respective films are formed by appropriately adjusting film thickness and composition in accordance with desired characteristics.

Examples of preparation of the magnetic recording medium substrate and magnetic recording medium in accordance with the aforementioned processes will be described hereinafter.

EXAMPLES

Examples will be described hereinafter.

Example 1

For a hard disk drive (4200 rpm) with a diameter of 2.5 inches in which a recording capacity of about 5 GB per medium is required, an example of the medium design will be described.

(1) Design of Rmax Defined From Required Glide Height

In order to achieve the recording capacity of 5 GB, for reasons of enhancement of an S/N ratio and narrowing of a track width, it is necessary to reduce the flying amount of a read/write (R/W) head down to about 20 nm. Therefore, the glide height has to be reduced to about 8 to 10 nm. This means that even in a slight head flying amount of 10 nm, no contact between head and medium has to occur.

Figure 3:
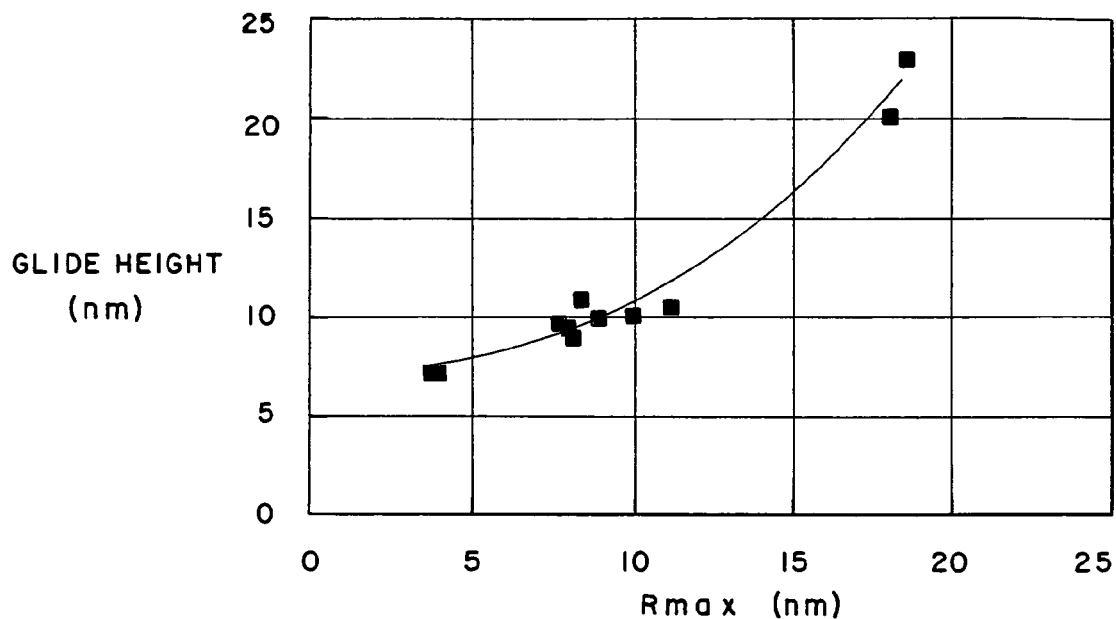
FIG. 3 is a diagram showing a relation between Rmax by the AFM measurement and a glide height.

FIG. 3 is a graph showing a relation of the medium surface roughness Rmax (measured by AFM) with the magnetic head flying amount (glide height) at which the magnetic head starts to contact the medium surface. In order to achieve the glide height of 10 nm required from the graph, Rmax has to be set to about 8 nm or less.

(2) Design of Friction Coefficient in Rmax Defined in the Above (1)

By the above (1), Rmax for achieving the required glide height is defined. Under this restriction, design of the friction coefficient is performed to avoid magnetic head adsorption with respect to the medium. An upper limit of the friction coefficient of the hard disk drive is defined by a spindle motor drive torque. When friction is large enough to prevent rotation with the drive torque, the magnetic head adheres to the medium surface. In a model of 4200 rpm motor in the present example, the upper limit of the friction coefficient is defined to 3 or less.

Additionally, as described above, since OBA % for controlling the friction coefficient is representative of a protrusion density within a given depth space, it is necessary to determine a slice position most sensitive to the friction in accordance with the defined Rmax.

Figure 4:
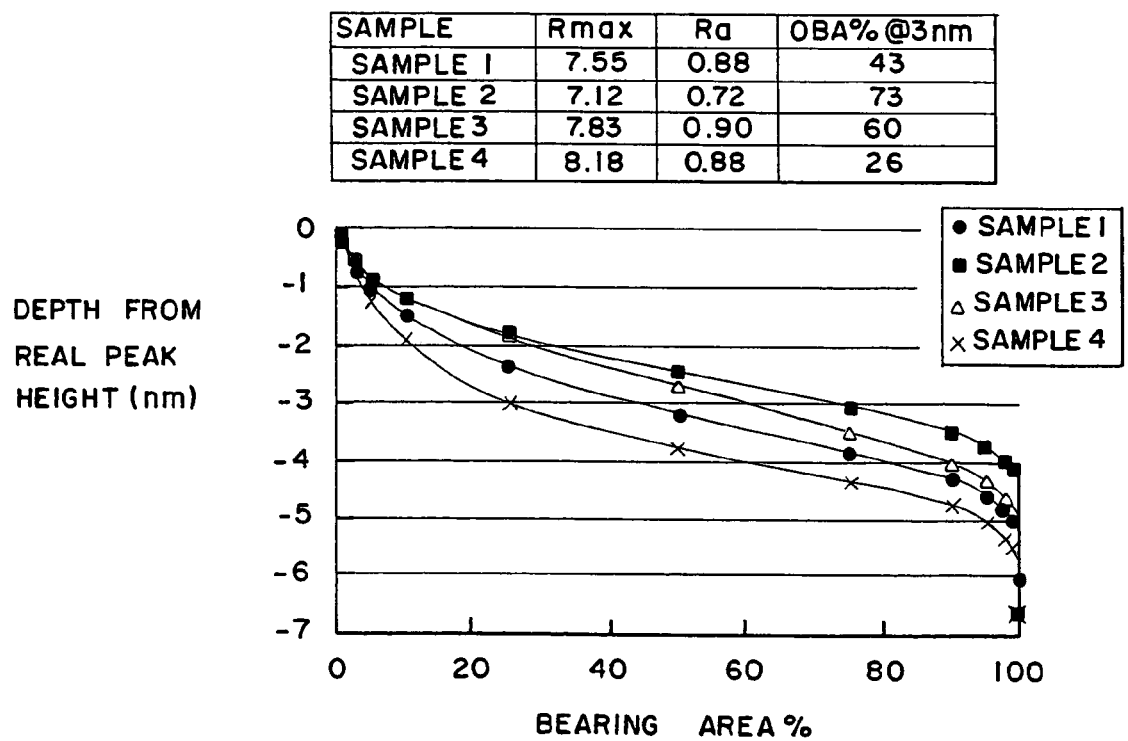
FIG. 4 is an explanatory view of a relation between BA % by the AFM measurement and a depth from a real peak height.

FIG. 4 shows bearing curves in various prepared mediums in which the Rmax defined in the above (1) is in the vicinity of 8 nm. Values of Rmax and Ra of the respective mediums are substantially equal to one another, but the bearing curves are largely different from one another, protrusion densities, protrusion shapes, and the like are therefore different, and further the friction coefficients are also different from one another. To distinguish these mediums (the friction coefficients) from one another, as an optimum slice level, a depth of 3 nm from a bearing height (real peak height) corresponding to a bearing area of 0.5% is set. Moreover, a bearing area when the slice level is offset from the maximum protrusion height in this manner is set as an offset bearing area, and represented by OBA % @ 3 nm.

Figure 1:
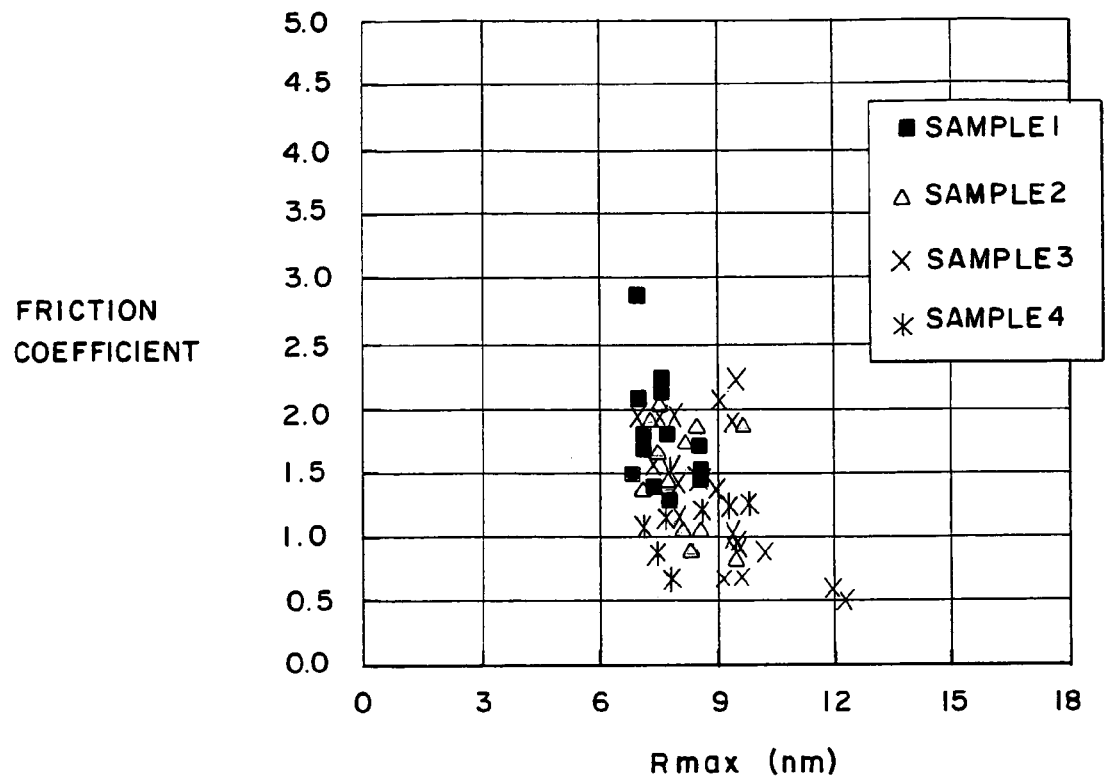
FIG. 1 is a diagram showing a relation between Rmax by AFM measurement and a friction coefficient.
Figure 2:
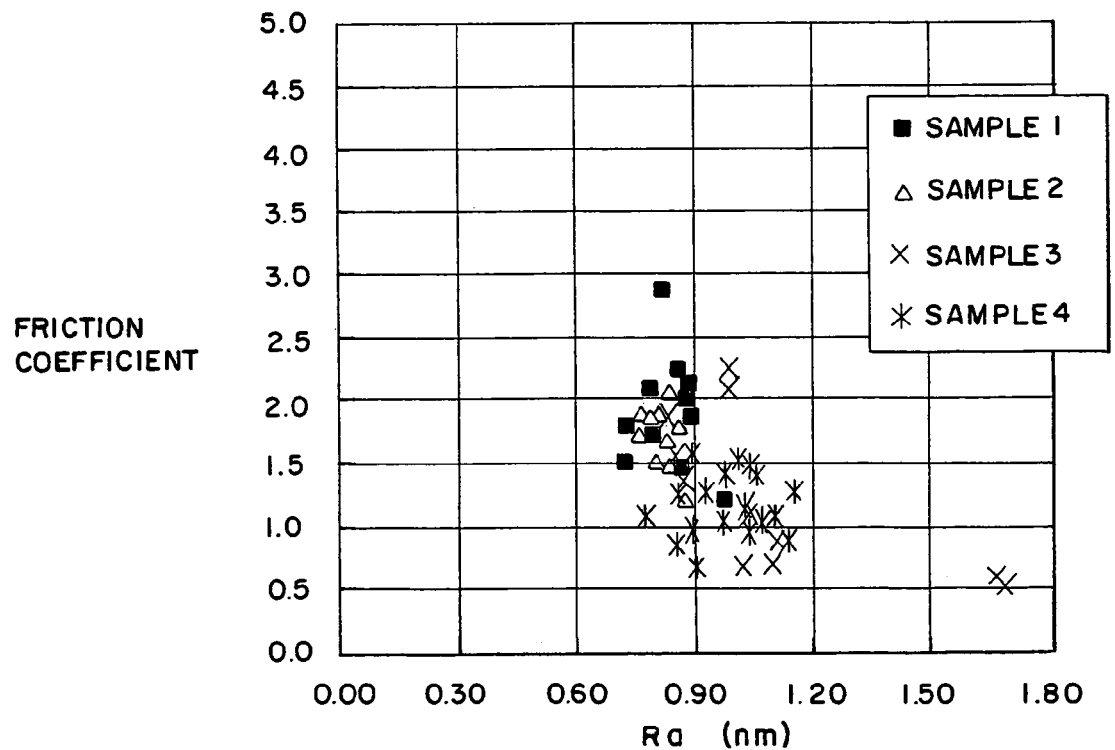
FIG. 2 is a diagram showing a relation between Ra by the AFM measurement and the friction coefficient.
Figure 5:
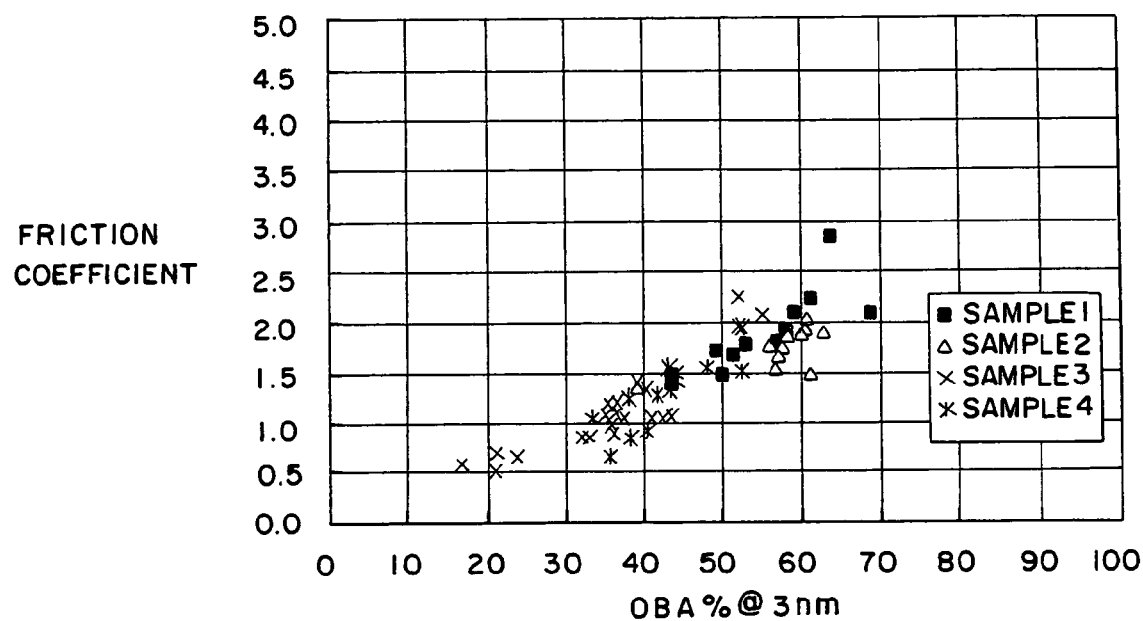
FIG. 5 is a diagram showing a relation between OBA % @ 3 nm and the friction coefficient.

FIG. 5 represents a group shown in FIG. 2 in OBA % @ 3 nm. By introducing the OBA % @ 3 nm, friction coefficient management, which was impossible with Rmax, Ra, Rmax/Ra, has been enabled. With respect to definition of the upper limit value of the friction coefficient of less than 3, a constant margin is secured, and standard management is performed with OBA % @ 3 nm of 40%±20%.

Therefore, the friction coefficient is managed in a range of 0.5 to 2.5.

In order to achieve Rmax, OBA % @ 3 nm of 40%±20% defined in the above (1), (2) on the magnetic recording medium surface, in the present example, the magnetic recording medium substrate was prepared so that the surface roughness was Rmax, OBA % @ 3 nm of 40%±20% as defined above, and the underlayer, magnetic layer, protective layer, and lubricant layer were formed on the substrate to prepare the magnetic recording medium.

(3) Preparation of Substrate for Magnetic Recording Medium

The disc-shaped glass substrate was obtained by directly pressing molten glass, and through the shape processing (hole making, chamfer processing) and end surface polishing step, an aluminosilicate glass substrate with an outer diameter of 65 mmϕ, inner diameter of 20 mmϕ was obtained. Thereafter, through the lapping step, polishing step, chemical reinforcing step, and etching treatment by silicofluoric acid, the glass substrate for the magnetic recording medium was prepared.

Additionally, the surface roughness of the glass substrate (measured by AFM) after the polishing step was Rmax=5.72 nm, Ra=0.53 nm. Moreover, for the chemical reinforcing conditions, the step was performed in a mixture molten salt of potassium nitrate and sodium nitrate at treatment temperature: 340° C., treatment time: two hours, and for the silicofluoric acid treatment conditions after chemical reinforcement, the step was performed at concentration: 0.12 vol %, treatment time: 100 seconds. When the surface roughness of the obtained glass substrate was measured with the atomic force microscope (AFM), Rmax=6.92 nm, Ra=0.79 nm, and OBA % @ 3 nm=41%.

(4) Preparation of Magnetic Recording Medium

By using an inline type sputtering apparatus to successively form an NiAl seed layer, CrV underlayer, CoCrPtTa magnetic layer, and carbon hydride protective layer on both surfaces of the magnetic recording medium glass substrate obtained by the above (3), and forming a film of a perfluoro polyether liquid lubricant (manufactured by Fonbrin Co., Ltd.: Zdol 2000) by a dip method, the magnetic recording medium was prepared.

When the surface roughness of the obtained magnetic recording medium was measured with the atomic force microscope (AFM), Rmax=7.55 nm, Ra=0.88 nm, OBA % @ 3 nm=43%, and the friction coefficient was about 1.5. Moreover, TDFH of the obtained magnetic recording medium was 8.4 nm. In this manner, the magnetic recording medium within the design range was obtained.

Furthermore, when CSS durability test was performed 100,000 times, neither head crush nor adsorption phenomenon occurred. Moreover, no head wear phenomenon was seen.

Additionally, when reproduction property of repeated measurement (consecutive 21 times) was checked in the same measurement area by AFM, a bearing area (BA % @ 4 nm) measured value in a depth of 4 nm from Rmax was 3.6 at 3σ and scattering was large, and the measured value of OBA % @ 4 nm was 1.8 at 3σ and the scattering was reduced by half. Specifically, it is seen that OBA % fails to be easily influenced by the AFM measurement error (scattering).

Example 2

In Example 1, (1) under restriction of Rmax defined by the glide height, (2) the medium surface with a satisfactory friction coefficient was designed, (3) the magnetic recording medium substrate having the surface roughness obtained by the design was prepared, and (4) at least the magnetic layer was formed on the substrate to prepare the magnetic recording medium.

Specifically, a right-side first term (μN) represented in the aforementioned friction force equation F=μN+F1+F2+F3+ . . . was designed.

Here, for reduction of the friction force, it is also important to minimize contribution of linearly joined right-side second term (meniscus force F1 by the lubricant).

Therefore, in Example 2, by using the friction coefficient management technique to optimize the applied lubricant, the magnetic recording medium for a higher recording density is prepared.

Concretely, the following two lubricants classified in perfluoro alkyl polyether (PFPE) were studied as the lubricant. Additionally, both the lubricants include ether joining in a main chain, and are provided with —$(OCF_2F_2)_m(OCF_2)_n$— straight chain structure.

Figure 6:
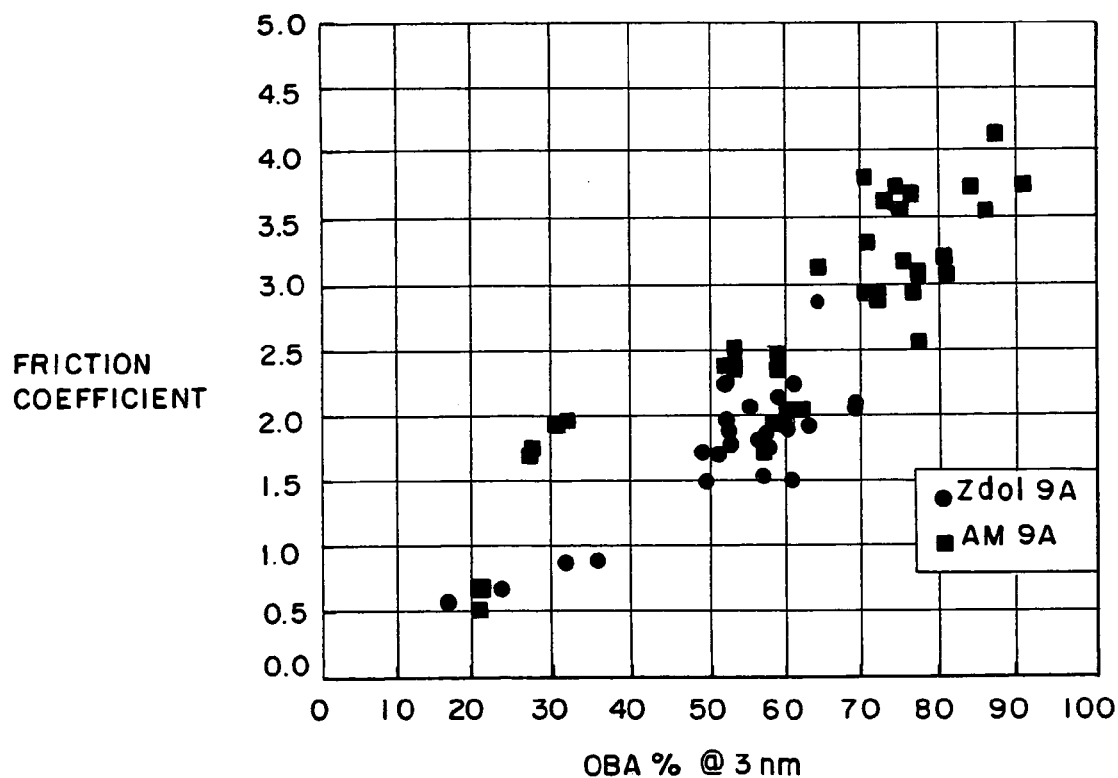
FIG. 6 is a diagram showing a relation between OBA % @ 3 nm and the friction coefficient in a medium with a lubricant applied thereto.
Figure 7:
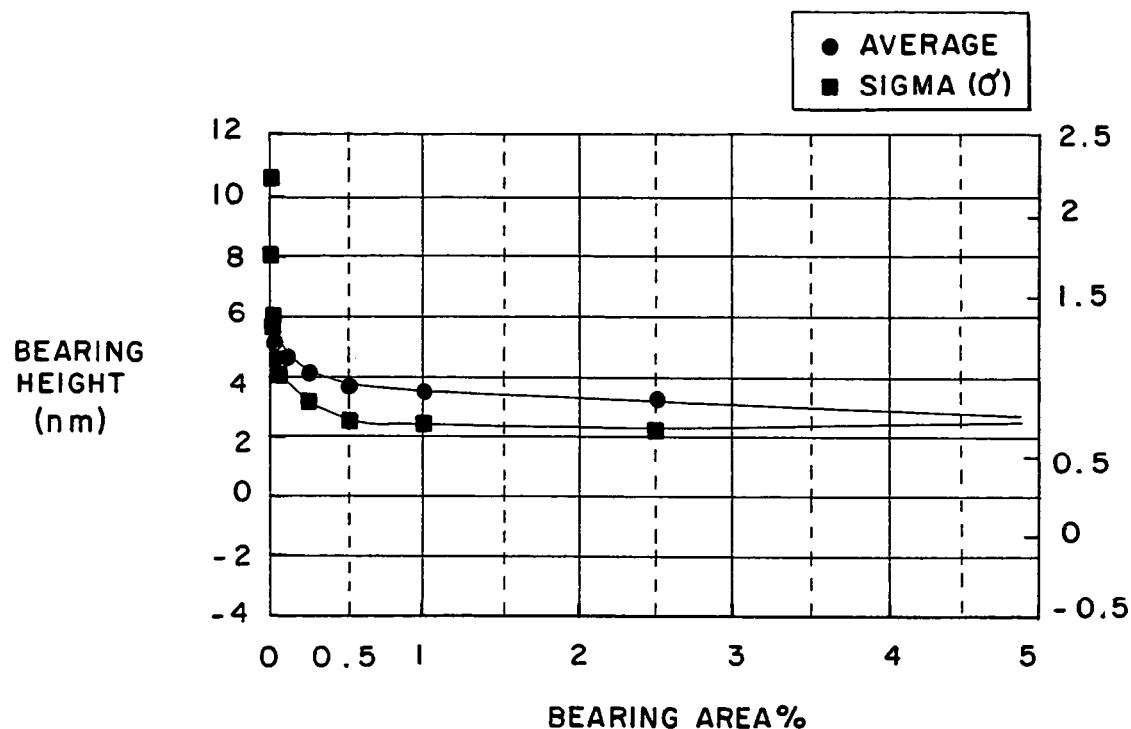
FIG. 7 is a diagram showing a relation between BA % and a bearing height in the vicinity of a maximum protrusion height.
Figure 8:
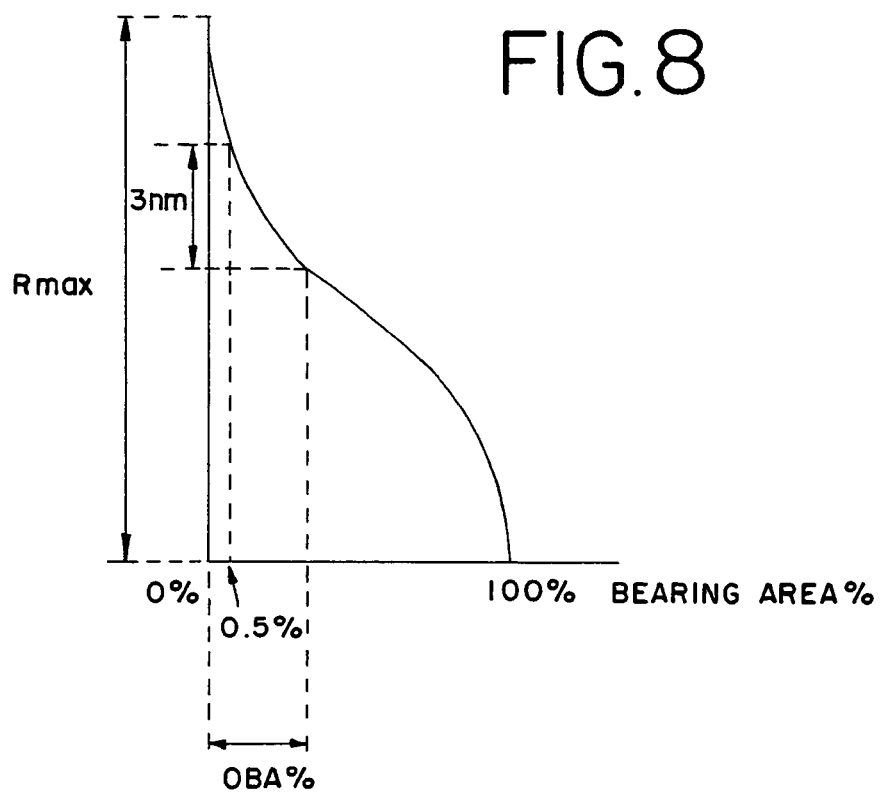
FIG. 8 is an explanatory view of an offset bearing area.
Figure 9:
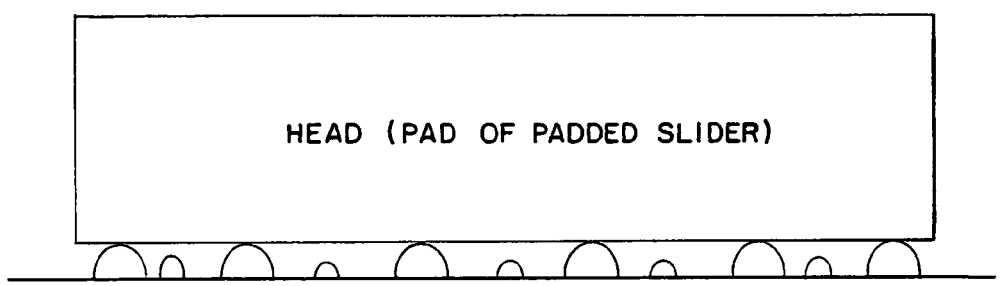
FIG. 9 is an explanatory view of a contact state of a head with a protrusion.
Figure 10:
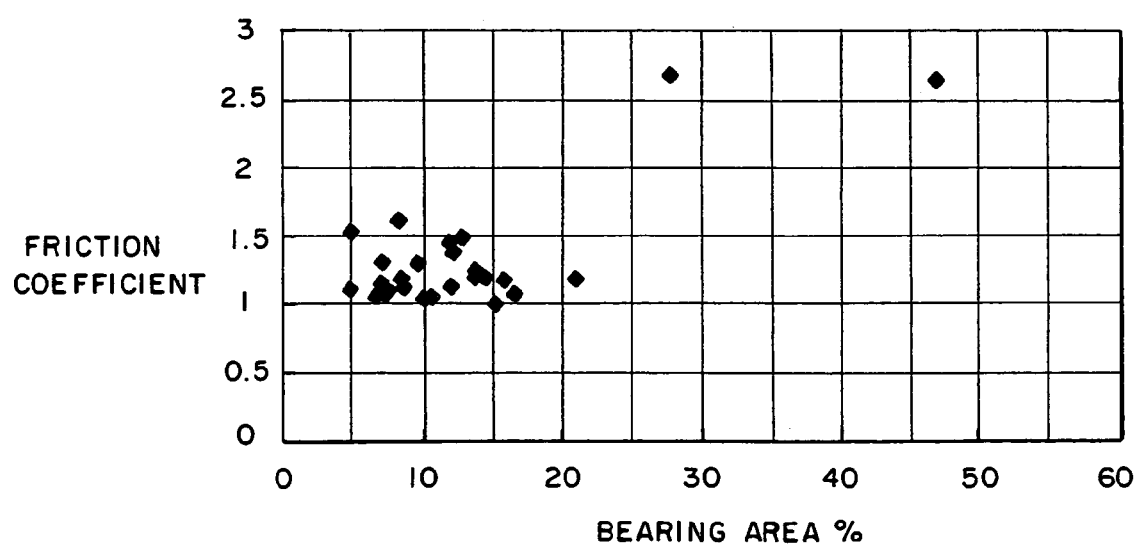
FIG. 10 is a diagram showing a relation between BA % @ 4 nm and the friction coefficient.

(a) Zdol 2000: terminal group=hydroxyl group, (b) AM 3000: terminal group=piperonyl group FIG. 6 is a diagram showing a relation between OBA % @ 3 nm and the friction coefficient with respect to both the lubricants. As shown in FIG. 6, in a combination of magnetic head and medium in the present example, for (a) Zdol 2000, the friction coefficient can be reduced more (F1 is smaller).

Therefore, by using the selected lubricant to prepare the magnetic recording medium, a preferable magnetic recording medium for a higher recording density can be obtained.

Examples 3 to 6

The magnetic recording medium substrate and magnetic recording medium were prepared similarly as Example 1, except that in Example 1 the chemical treatment by silicofluoric acid was performed between the polishing step and the chemical reinforcing step and the surface roughness was controlled. Additionally, in order to perform the surface roughness control, the glass substrate was manufactured using glass containing at least an alkali metal oxide and alkaline earth oxide with a content of the alkaline earth oxide being less than 3 mol % (specifically, containing $SiO_2$: 58 to 75 wt %, $Al_2O_3$: 5 to 23 wt %, $Li_2O$: 3 to 10 wt %, $Na_2O$: 4 to 13 wt % as main components). The silicofluoric acid treatment was performed between the polishing step and the chemical reinforcing step on conditions of concentration: 0.12 vol %, treatment time: 200 seconds. Moreover, by changing a silicofluoric acid treatment time after chemical reinforcement to 70 seconds (Example 3), 80 seconds (Example 4), 90 seconds (Example 5), 100 seconds (Example 6), a change of surface roughness by the treatment time was checked.

Figure 15:
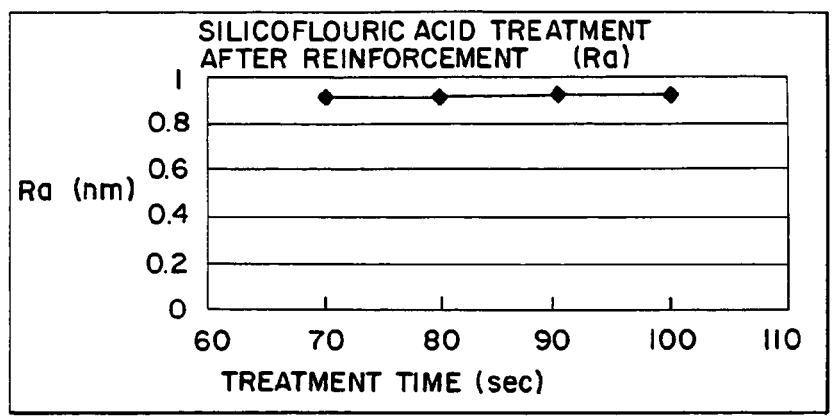
FIG. 15 is a diagram showing a result of AFM measurement of a surface roughness (Ra) according to the silicofluoric acid treatment after chemical reinforcement.
Figure 16:
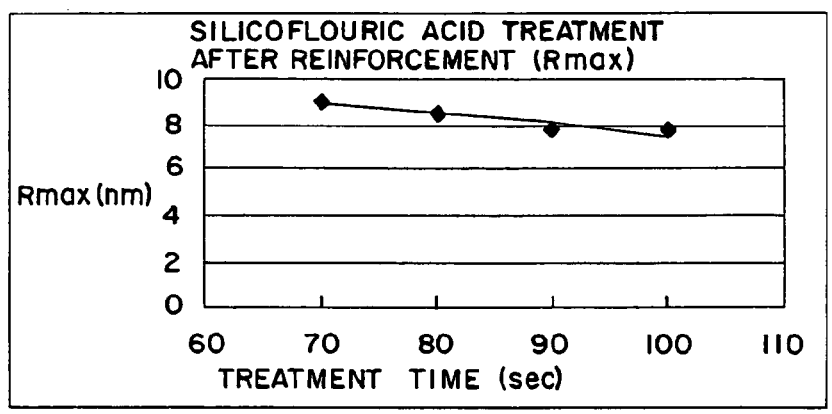
FIG. 16 is a diagram showing a result of AFM measurement of a surface roughness (Rmax) according to the silicofluoric acid treatment after chemical reinforcement.
Figure 17:
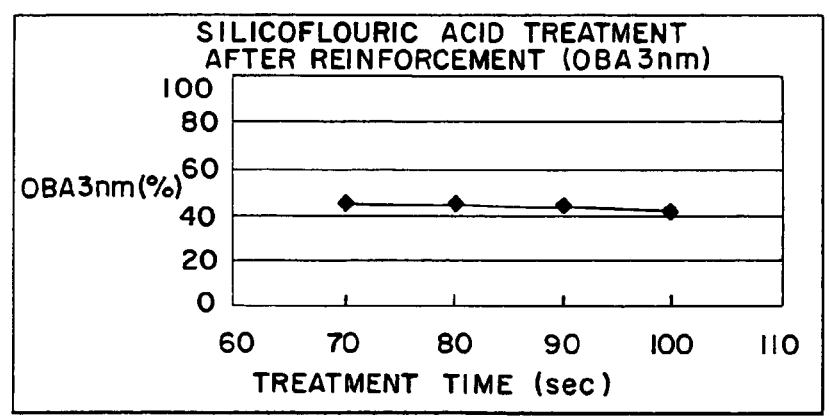
FIG. 17 is a diagram showing a result of AFM measurement of a surface roughness (OBA 3 nm) according to the silicofluoric acid treatment after chemical reinforcement.

As a result, as shown in FIGS. 15 to 17, it is seen that when the treatment time of the silicofluoric acid treatment after chemical reinforcement lengthens, Ra is substantially constant, but Rmax is lowered. From this, it is considered that by the silicofluoric acid treatment after chemical reinforcement, the abnormal protrusion attributed to the AFM measurement scattering is removed, Rmax is reduced, and as a result OBA % can also be controlled without any scattering.

Examples 7 to 9

Subsequently, by appropriately adjusting the polishing conditions and the silicofluoric acid treatment conditions after chemical reinforcement in Example 1, the magnetic recording medium substrate and magnetic recording medium for a load/unload system were prepared. The magnetic recording mediums of Examples 7, 8, 9 were prepared by performing the medium design and friction coefficient management so that respective recording capacities were 5 GB, 10 GB, 15 GB.

The surface roughness (Rmax, OBA %) of Examples 7 to 9 is shown in the following.

TABLE (the following numeric values show the surface states of the magnetic recording medium substrates.)

|           | Rmax    | Slice level | OBA % | Flying characteristic |
|-----------|---------|-------------|-------|----------------------|
| Example 7 | 6.93 nm | 3 nm        | 90%   | Satisfactory         |
| Example 8 | 5.79 nm | 2 nm        | 65%   | Satisfactory         |
| Example 9 | 2.89 nm | 1 nm        | 80%   | Satisfactory         |

As shown in the above table, the magnetic recording medium satisfactory also in flying characteristics (head crush and fly stiction) was obtained.

Comparative Example 1

The magnetic recording medium substrate and magnetic recording medium were prepared similarly as Example 1 except that the silicofluoric acid treatment after the chemical reinforcement in Example 1 was replaced with sulfuric acid treatment (concentration: 10 wt %, time: 100 seconds). As a result, Rmax=6.15 nm, OBA % 3 nm=72%, and the ratio could not be in the standard range of OBA % 3 nm=40%±20%. This is because the abnormal protrusion supposedly causing the AFM measurement scattering could not be sufficiently removed and OBA % 3 nm could not supposedly be controlled. Additionally, in the measurement, the friction coefficient of the obtained magnetic recording medium was 3.5, exceeding 3, and the adsorption of the magnetic head could not be avoided.

The present invention is not limited to the aforementioned examples.

For example, OBA slice is not limited to 3 nm, and is appropriately selected in accordance with various mediums.

A place in which the medium surface roughness is made is not limited to the substrate surface. For example, the texture may be formed on the underlayer, protective layer, and the like. The method of forming the predetermined surface roughness is not limited to the etching method, and the predetermined surface roughness may be obtained by a mechanical texture, sputter texture, laser texture, and mixed fine particles. Additionally, preferable is a texture method in which respective protrusion curvature radii are substantially the same.

As the technique of measuring the surface state, instead of the atomic force microscope (AFM), a scanning tunnel microscope (STM), or a probe type surface roughness meter may be used. Additionally, the atomic force microscope (AFM) is superior to other measurement methods in that the surface state can relatively easily and correctly be measured with high precision and resolution.

Also for the lubricant in Example 2, th lubricants suitable for various mediums are selected. The lubricant forming method is not limited to the dip method (immersion method). The lubricant may be formed by vacuum deposition.

The present invention is not limited to the CSS system magnetic recording medium, and is also effective as a management technique for avoiding the flying stiction in the load/unload system magnetic recording medium in which the low flying of the magnetic head is further developed as shown in Examples 7 to 9.

Moreover, the chemical liquid for use in the chemical treatment step in the surface roughness control step after the polishing step is not limited to silicofluoric acid, and the treatment may be performed with the treatment liquid containing at least one acid selected from sulfuric acid, phosphoric acid, nitric acid, hydrofluoric acid, and silicofluoric acid, or alkali.

A substrate size is not limited to 2.5 inches, and the present invention can be applied to various sizes such as 1 inch, 3 inches, and 3.5 inches.

Moreover, the present invention can be applied to, not limited to information (magnetic) recording medium substrate or information (magnetic) recording medium, optical magnetic recording medium substrate and optical magnetic recording medium recorded/reproduced by using head slider loaded with optical pickup lens and is also effective as their surface management technique.

According to the present invention, in the information recording medium substrate and information recording medium having the surface roughness (texture) of Rmax 15 nm or less (especially Rmax 10 nm or less), the friction coefficient based on the surface roughness can precisely be designed or managed.

Moreover, according to the present invention, in the management of the surface state having the surface roughness (texture) of Rmax 15 nm or less (especially Rmax 10 nm or less), the AFM measurement error problem can be solved.

What is claimed is:

1. A method of manufacturing a glass substrate for an information recording medium, comprising the steps of:
    immersing the glass substrate in a heated chemical reinforcing treatment liquid, and subjecting an ion on a glass substrate surface layer to ion exchange with an ion in the chemical reinforcing treatment liquid to chemically reinforce the glass substrate; and
    treating the surface of the glass substrate drawn up from the chemical reinforcing treatment liquid with a treatment liquid containing silicofluoric acid to control an offset bearing area value to a desired value.

2. A method of manufacturing a glass substrate for an information recording medium, comprising the steps of:
    polishing a glass substrate surface; and
    immersing the glass substrate in a heated chemical reinforcing treatment liquid, and subjecting an ion of a glass substrate surface layer to ion exchange with an ion in the chemical reinforcing treatment liquid to chemically reinforce the glass substrate,
    said method further comprising the steps of:
    controlling the glass substrate surface by a chemical treatment to provide a desired surface roughness before the chemical reinforcing step; and
    treating the surface of the glass substrate drawn up from said chemical reinforcing treatment liquid with a treatment liquid containing silicofluoric acid to control an offset bearing area value to a desired value.

3. The method of manufacturing the glass substrate for the information recording medium according to claim 2 wherein chemical treatment performed before the step of chemically reinforcing the glass substrate comprises treatment with the treatment liquid containing at least one acid selected from the group consisting of sulfinic acid, phosphoric acid, nitric acid, hydrofluoric acid, and silicofluoric acid, or alkali.

4. The method of manufacturing the glass substrate for the information recording medium according to any one of claims 1 to 3 wherein a concentration of said silicofluoric acid is in a range of 0.01 to 10 wt %.

5. A method of manufacturing an information recording medium, comprising the steps of forming at least a recording layer on the surface of the information recording medium glass substrate obtained by claims 1 to 4.

6. The manufacturing method according to claim 1, wherein the surface of the substrate is treated with the treatment liquid containing silicofluoric acid so that a bearing area value (offset bearing area value) in a depth of 0.5 to 5 nm (predetermined slice level) from a bearing height (real peak height) corresponding to the bearing area value of 0.2% to 1.0% is 90% or less.

7. The manufacturing method according to claim 1, wherein the surface of the substrate is treated with the treatment liquid containing silicofluoric acid so that when a depth corresponds to 20 to 45% of Rmax from a bearing height (real peak height) corresponding to a bearing area value of 0.2% to 1.0% is set as a slice level, the bearing area value (offset bearing area value) is 90% or less.

8. The manufacturing method according to claim 2, wherein the surface of the substrate is treated with the treatment liquid containing silicofluoric acid so that a bearing area value (offiet beaxing area value) in a depth of 0.5 to 5 nm (predetermined slice level) from a bearing height (real peak height) corresponding to the bearing area value of 0.2% to 1.0% is 90% or less.

9. The manufacturing method according to claim 2, wherein the surface of the substrate is treated with the treatment liquid containing silicofluoric acid so that when a depth corresponds to 20 to 45% of Rmax from a bearing height (real peak height) corresponding to a bearing area value of 0.2% to 1.0% is set as a slice level, the bearing area value (offiet bearing area value) is 90% or less.

* * * * *